Figure 1:
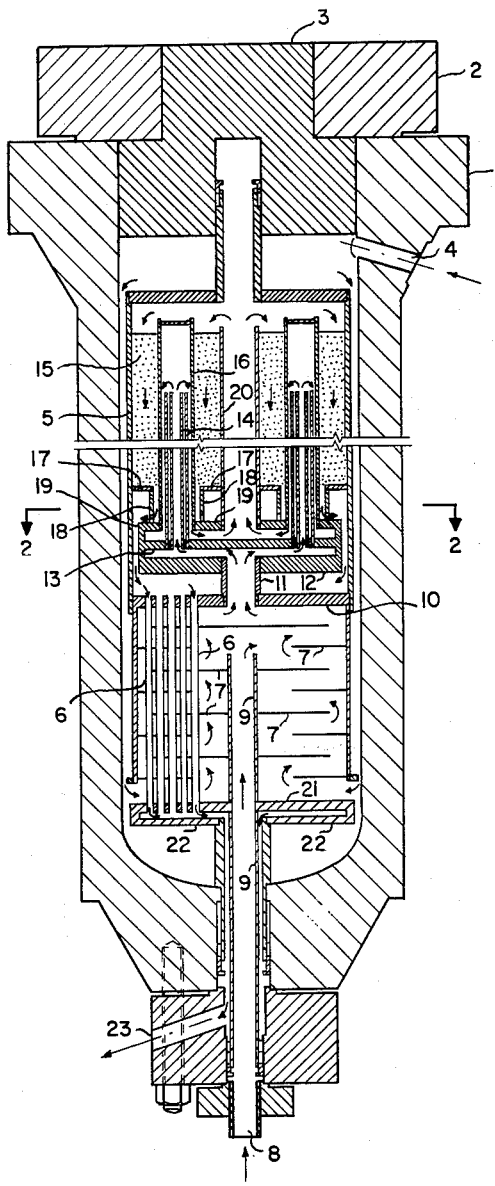

Oct. 19, 1965   A. CHRISTENSEN   3,212,862
APPARATUS FOR EXOTHERMIC CATALYTIC REACTIONS
Filed Feb. 19, 1963   3 Sheets-Sheet 1

AXEL CHRISTENSEN
*INVENTOR.*

BY
AGENT

Oct. 19, 1965 A. CHRISTENSEN 3,212,862
APPARATUS FOR EXOTHERMIC CATALYTIC REACTIONS
Filed Feb. 19, 1963 3 Sheets-Sheet 2

AXEL CHRISTENSEN
*INVENTOR.*
BY J. T. Chaboty
AGENT

United States Patent Office 3,212,862
Patented Oct. 19, 1965

3,212,862
APPARATUS FOR EXOTHERMIC CATALYTIC REACTIONS
Axel Christensen, Stamford, Conn., assignor to Chemical Construction Corporation, New York, N.Y., a corporation of Delaware
Filed Feb. 19, 1963, Ser. No. 259,682
7 Claims. (Cl. 23—289)

This invention relates to an apparatus for effecting an exothermic vapor phase catalytic reaction wherein a gaseous reaction mixture is passed through a stationary catalyst bed, preferably while in parallel or cocurrent flow with unreacted gas mixture which is flowing through cooling tubes disposed in the catalyst bed. An apparatus modification is provided, which accomplishes an extra increment of preheat of the unreacted gas mixture prior to catalytic conversion, by heat exchange with the fully reacted gas mixture. This modification is applicable to apparatus for accomplishing such reactions as ammonia synthesis, the synthesis of methanol from hydrogen and carbon monoxide, the Fischer-Tropsch synthesis of hydrocarbons and higher alkanols and other similar hydrogenation reactions.

The apparatus used in this invention is somewhat similar to the converters described in U.S. Patents Nos. 1,707,417; 2,853,371 and 3,041,151. These patents relate to the cooling of the reacting gas while in the catalyst bed by means of colder unreacted gas which is passed through cooling tubes disposed in the catalyst bed. The heated unreacted gas is then passed to the catalyst bed. The reacting gas in the catalyst and the cooling gas in the tubes flow in the same direction. This is known as cocurrent flow. The cooling tubes extend upwards through a lower grate which supports the catalyst bed, and are mounted in a horizontal gas distribution baffle below the catalyst bed. In the prior practice, the hot fully reacted gas which passes downwards from the catalyst bed via a spacing between the grate and the cooling tube, is immediately passed horizontally in the space between the grate and the gas distribution baffle, for eventual passage to the heat exchanger section of the converter.

In the present invention, a new and effective heat transfer surface is built into the converter in the section between the plate which supports the catalyst bed and the gas distribution baffle disposed below the plate. This accompilshes an effective heat exchange between the converted gas leaving the catalyst bed and the unreacted gas in the lower part of the cooling tubes. The heat transfer surface is obtained by providing sleeves around the cooling tubes. The sleeves extend vertically between the gas distribution baffle and the openings in the plate, and are provided with lower openings adjacent to the gas distribution baffle for discharge of reacted gas. Thus, the hot reacted gas leaving the catalyst bed is forced down through the annuli between the sleeves and the cooling tubes and leaves the sleeves via the lower openings.

A significant additional increment of preheating of the unreacted gas is thus accomplished. It has been determined that this additional increment of preheat is of great importance, in providing a higher inlet temperature of the unreacted gas to the catalyst bed. Thus, catalytic reaction takes place more rapidly, and full reaction rate is attained close to the top of the catalyst bed. The net result is that production capacity per unit volume of catalyst is significantly increased and greater catalytic conversion is attained with a smaller catalyst bed. In effect, the unreacted gas going to the catalyst is preheated to a temperature close to that of the fully reacted gas leaving the catalyst without an additional expenditure of converter volume. Thus, the catalyst bed volume required for a given conversion capacity is significantly reduced, since the top sections of the catalyst bed are more effectively utilizsed in catalytic conversion. The overall result is that higher output rate is obtained wtihout increasing the size of the converter.

It is an object of the present invention to provide an improved aparatus for exothermic catalytic reactions.

Another object is to provide an apparatus which preheats the unreacted gas stream to a higher temperature level prior to catalytic conversion.

Still another object is to provide an apparatus for exothermic catalytic conversions which achieves higher output in a fixed converter volume.

A further object is to provide an apparatus which includes effective heat transfer surface for heat exchange between the fully converted gas and the unreacted gas stream, after the unreacted gas stream has been preheated in the catalyst bed.

It is an additional object to be able to preheat the unreacted gas going to the catalyst to a temperature close to that of the reacted gas leaving the catalyst and with a minimum expenditure of converter volume.

An object is to provide an apparatus for exothermic catalytic reactions which achieves higher conversion per unit volume of catalyst bed.

Figure 2:
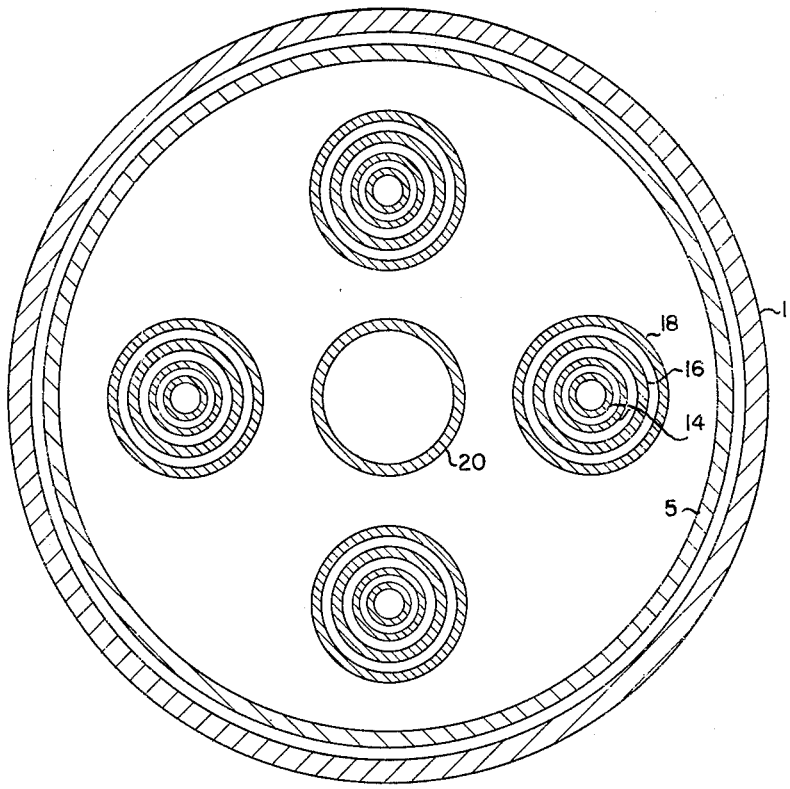
Figure 3:
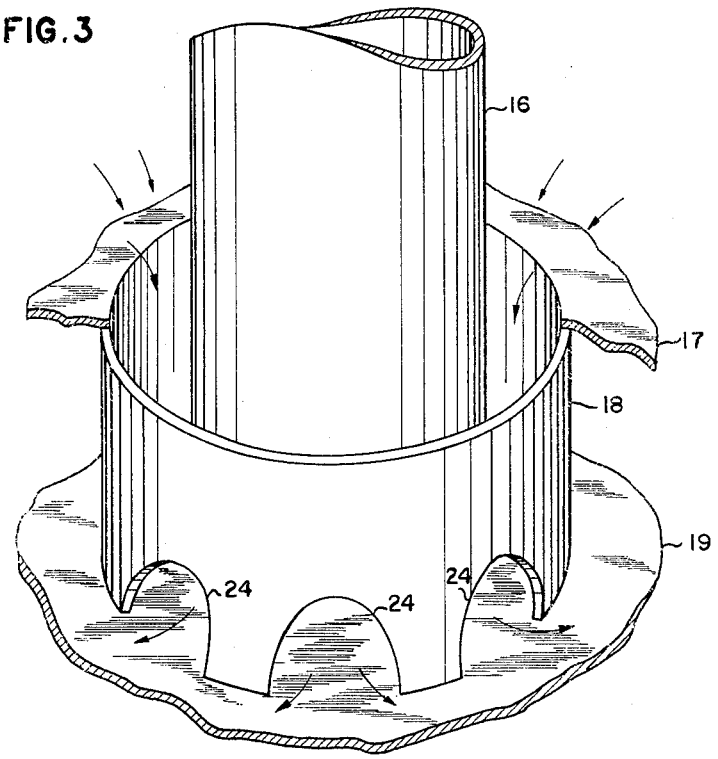

These and other objects and advantages of the present invention will become evident from the description which follows. In this description, FIGURE 1 is an overall elevation view of a converter for exotheric catalytic reactions which contains the apparatus modification of the present invention, FIGURE 2 is a plan view of the converter of FIGURE 1, taken on section 2—2, and FIGURE 3 is an isometric view of the sleeve element which provides the novel heat exchange effect of the present invention, together with associated apparatus elements.

Referring now to FIGURE 1, the high pressure converter consists basically of a chamber defined by high pressure shell 1 and cap plates 2 and 3. The unconverted feed gas enters via 4 and passes down through the annular space between shell 1 and circulating plate 5. This preferable arrangement provides maximum cooling for the shell. The gas leaves the annular space toward the bottom of the converter chamber, and passes upwards on the shell side of the heat exchanger defined by the lower section of plate 5, tubes 6 and baffles 7.

The gas stream is warmed by heat exchange with the gas inside tubes 6, and toward the upper or warm end of the exchanger an additional quantity of cold feed gas may be intermixed with the warmed gas for temperature control. This additional quantity of cold gas is admitted via 8 and passes upwards through central conduit 9.

The total warmed feed gas stream is now directed inwards by baffle 10 and upwards through central conduit 11. The gas stream next passes into the distributing chamber defined by baffle 12 and lower distributing baffle 13, which are joined at their outer perimeters. The gas stream is thus directed upwards through inner ducts 14, which may be of an insulating nature. Thus, ducts 14 will preferably consist of double-walled elements as shown, with a stagnant gas space between the walls for insulation purposes.

The gas stream is conducted by ducts 14 into heat exchange with the catalyst bed 15, passing upwards through ducts 14 and then flowing downward in cocurrent heat exchange in the annular space between ducts 14 and concentric outer conduits 16. The feed gas stream is thus warmed further, and serves to moderate the temperature rise from the conversion reaction in the catalyst bed. As the feed gas stream continues flowing downwards in the annular space between duct 14 and conduit 16, it passes below the level of catalyst bed support plate 17, which is a plate provided with openings through which conduits 16 extend upwards into the catalyst bed 15. As will appear infra, further preheat of the feed gas stream takes place below plate 17, by means of heat exchange with the hot fully reacted gas stream which is directed externally adjacent to conduit 16 by sleeve 18.

The feed gas stream, now completely warmed to the proper temperature for catalytic conversion, passes downwardly into the chamber defined by baffles 19 and 13, which are jointed at their outer perimeters. Thus, the feed gas stream is directed centrally inwards, and passes upwards through central conduit 20. The feed gas stream is then dispersed over the top of catalyst bed 15, and passes downwards through bed 15 for catalytic conversion. Heat generated due to exothermic reaction is removed by heat exchange with cooler feed gas mixture inside conduits 16.

The fully reacted gas stream now leaves catalyst bed 15 via the lower spacing between the openings in plate 17 and conduit 16, and is directed adjacent to the lower part of conduit 16 by sleeve 18. The sleeve 18 is provided with lower outlets for final discharge of the reacted gas stream into the space defined between plate 17 and baffle 19. While passing between sleeve 18 and conduit 16, the hot reacted gas stream is in heat exchange relation with the feed gas stream inside conduit 16, and provides an additional and highly significant increment of preheat to the feed gas stream. The reacted gas stream now passes outwards in the space between plate 17 and baffle 19, and downwards in the peripheral space between baffles 19, 13 and 12 and the circulating plate 5. The reacted gas stream next passes into the chamber defined between baffles 10 and 12, and downwards through tubes 6 of the heat exchanger section. The cooled reacted gas is discharged from tubes 6 into the collection space defined between baffles 21 and 22 and passes downwards in the annular external to conduit 9 for eventual discharge via 23.

FIGURE 2 is a sectional plan view of the apparatus, taken on section 2—2 of FIGURE 1. In FIGURE 2, the converter shell 1 is shown, together with circulating plate 5. In a preferred embodiment and conventional practice of the present invention, these elements as well as the double-walled inner duct 14, outer conduit 16 and sleeve 18 are shown as circular elements in FIGURE 2. It will be evident that other configurations of these apparatus elements besides a circular and coaxial arrangement are contemplated as being within the scope of the present invention.

FIGURE 3 is an isometric view of an individual sleeve, together with associated apparatus elements. The flow of reacted gas is shown passing down from the catalyst bed and into the spacing between plate 17 and conduit 16. The gas next proceeds downwards in the annular space between sleeve 18 and conduit 16, acting to heat the unreacted gas inside conduit 16. The reacted gas next passes through lower slots or openings 24, and is directed horizontally by baffle 19 for eventual passage to the lower heat exchanger section of the converter.

It will be evident that a primary distinction of the present invention resides in the fact that the sleeve element serves to further preheat the unreacted gas inside conduit 16 after this gas stream has been successively preheated in the lower heat exchanger section and by heat exchange inside conduit 16 with reacting gas in the catalyst bed itself. It has been determined that this additional increment of preheat results in a significant increase in total converter capacity and also per unit volume of catalyst bed. Thus, a standard converter for a 100 ton per day ammonia facility, when modified in accordance with the present invention, was provided with a total volume of catalyst bed which was only about 85% of the catalyst bed volume previously required. A concomitant increase in converter capacity to 110 tons/day output was also attained, with the smaller volume of catalyst bed.

I claim:

1. In an apparatus for effecting high pressure gaseous exothermic catalytic reactions comprising a reactor shell, means for introducing unreacted gas mixture into said shell, a lower heat exchanger section, means for passing said unreacted gas mixture and catalytically reacted gas in heat exchange relation through said heat exchanger section, an upper catalyst bed section provided with a horizontal lower plate for catalyst support, means to pass preheated unreacted gas mixture downwardly through said catalyst bed section whereby said gas mixture is catalytically reacted, a gas distributing section between said exchanger and bed section, said gas distributing section having an upper gas distribution baffle provided with a plurality of openings, a plurality of gas conduits for cooling of the catalyst bed, said conduits extending upwards through openings in said plate and into said bed from said openings in said upper gas distribution baffle, means to pass unreacted gas mixture downwardly through said conduits, means to pass unreacted gas mixture upwards from below said gas distribution baffle to the top of said catalyst bed section, and exit means to conduit catalytically reacted gas out of said reactor from said exchanger section, the improved means for initial heat exchange between catalytically reacted gas and partially preheated unreacted gas mixture which comprises a plurality of sleeves extending between said openings in said plate and said upper gas distribution baffle, each of said sleeves being coaxially aligned external to one of said gas conduits, said sleeves being provided with lower openings for outlet of catalytically reacted gas, whereby catalytically reacted gas derived from said catalyst bed is directed adjacent to said gas conduits below said plate.

2. Apparatus of claim 1, in which said means to pass unreacted gas mixture downwardly through said conduits comprises inner ducts disposed within said conduits, said conduits being closed at their upper ends, together with means to pass unreacted gas upwardly through said inner ducts from said heat exchanger section.

3. Apparatus of claim 2, in which said inner ducts, conduits and sleeves are cylindrical and coaxially aligned.

4. Apparatus of claim 2, in which said inner ducts are double walled with an intermediate void space for thermal insulation.

5. In an apparatus for effecting high pressure gaseous exothermic catalytic reactions comprising a reactor shell, means for introducing unreacted gas mixture into said shell, a lower heat exchanger section, means for passing said unreacted gas mixture and catalytically reacted gas in heat exchange relation through said heat exchanger section, an upper catalyst bed section provided with a horizontal lower plate for catalyst support, a gas distributing section between said exchanger and bed sections, said gas distributing section being provided with upper and lower horizontal gas distribution baffles, each of said baffles having a plurality of openings for gas passage, a plurality of vertical outer conduits disposed within said catalyst bed for cooling, said outer conduits extending upwards through openings in said plate and said catalyst bed from openings in said upper gas distribution baffle and being closed at their upper ends, a plurality of vertical inner ducts coaxially aligned within said outer conduits, said inner ducts extending upwards from openings in said lower gas distribution baffle and terminating at upper gas outlets within said outer conduits, means to pass unreacted gas mixture from said heat exchange section to the lower side of said lower gas distribution baffle, whereby said unreacted gas mixture passes upwards through said inner ducts and downwards through the annular space between said inner ducts and outer conduits and is discharged into the gas collection space defined between said upper and lower gas distribution baffles, a central opening in said upper gas distribution baffle together with a central conduit extending upwards from said opening to the top of said catalyst bed, whereby said unreacted gas mixture is conducted to the top of said catalyst bed and passes downward through said catalyst bed, means to pass catalytically reacted gas from the section defined by said plate and said upper gas distribution baffle to said exchanger section, and exit means to conduct catalytically reacted gas out of said reactor from said exchanger section, the improved means for initial heat exchange between catalytically reacted gas and partially preheated unreacted gas mixture which comprises a plurality of sleeves extending between said openings in said plate and said upper gas distribution baffle, each of said sleeves being coaxially aligned external to one of said outer conduits, said sleeves being provided with lower openings for outlet of catalytically reacted gas, whereby catalytically reacted gas derived from said catalyst bed is directed adjacent to said outer conduits below said plate.

6. Apparatus of claim 5, in which said inner ducts, outer conduits and sleeves are cylindrical and coaxially aligned.

7. Apparatus of claim 5, in which said inner ducts are double walled with an intermediate void space for thermal insulation.

References Cited by the Examiner

UNITED STATES PATENTS

| | | | |
|---|---|---|---|
| 2,861,873 | 11/58 | Worn | 23—289 |
| 3,041,150 | 6/62 | Worn | 23—289 |
| 3,041,151 | 6/62 | Christensen | 23—289 |
| 3,050,377 | 8/62 | Christensen | 23—289 |

MORRIS O. WOLK, *Primary Examiner.*